Oct. 29, 1935.  G. A. NICOL, JR  2,019,233
INSULATION AND METHOD OF MANUFACTURE
Filed July 15, 1935
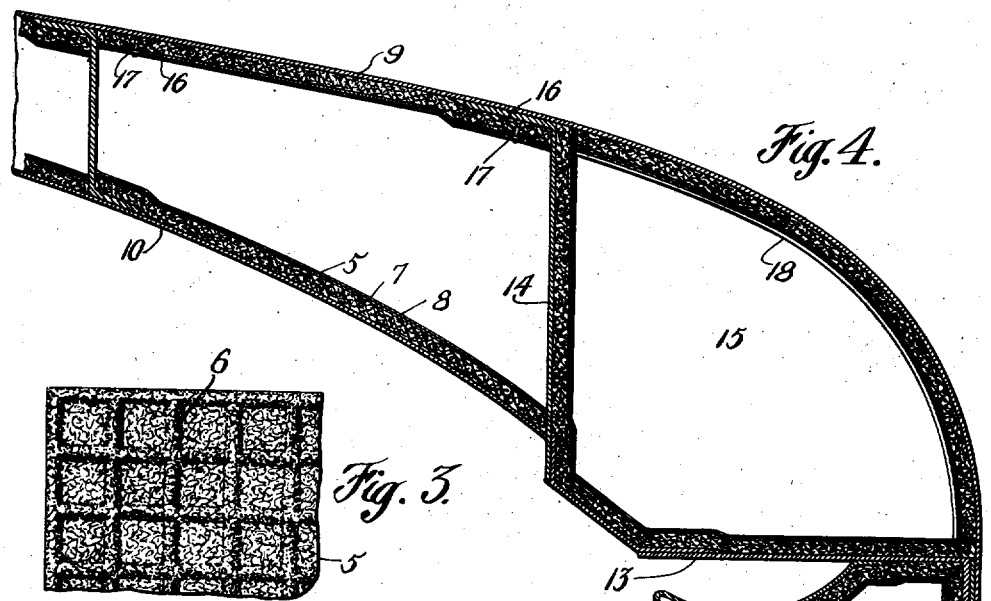
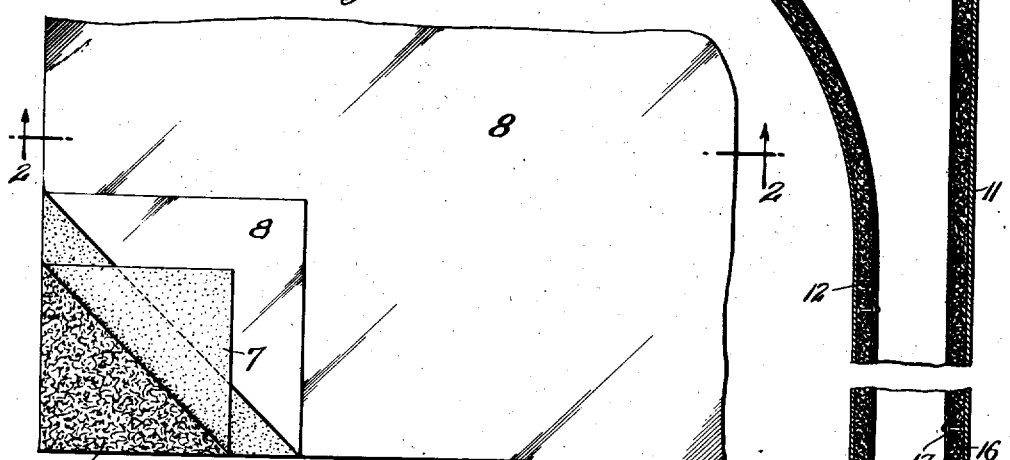
INVENTOR
George A. Nicol, Jr.
ATTORNEYS Patented Oct. 29, 1935

2,019,233

UNITED STATES PATENT OFFICE 2,019,233

INSULATION AND METHOD OF MANUFACTURE

George A. Nicol, Jr., New Rochelle, N. Y., assignor to George A. Nicol Corporation, New York, N. Y., a corporation of New York Application July 15, 1935, Serial No. 31,341

7 Claims. (Cl. 154—28)

This invention relates to the art of insulating wall structures and the insulating material disclosed is particularly useful in situations where the temperature differential is not excessive. Insulation for this purpose is known as low temperature difference type of insulation and its field of usefulness is well exemplified in the art of insulating railway vehicles such, for example, as passenger or refrigerator cars. It is also useful in connection with the insulation of automobile bodies and housing structures and the principal object of the invention is to provide an insulating material which has greatly improved characteristics both as to sound absorption and heat insulation as well as to an improved method for manufacturing it.

Before proceeding with a detailed description of the invention I wish to call attention to the fact that the matter of proper insulation of railway cars, especially passenger cars, has become increasingly important in recent years due to the advent of air-conditioning equipment for the economical and efficient operation of which very high grade insulation is required. Furthermore, the increasing use of stainless steels, aluminum alloys and high tensile and corrosion resisting alloy steels which make possible a very lightweight type of vehicle, has also made necessary the development of improved insulating materials, for the reason that the space between the outer and inner walls of passenger cars has been materially reduced. This, of course, makes it more important than ever to adequately insulate them not only as against changes in temperature but also as against reverberating or so-called telephonic noises, which latter have a tendency to increase in intensity as the space between the car plates and the thickness of the plates themselves is reduced and as the weight of the equipment is also reduced. The advent of steel bodies in automobiles and particularly the advent of the allsteel type has also demanded an insulating material of improved characteristics and my invention is applicable in all of the foregoing fields as well as in many other fields which will occur to those skilled in the art.

With the foregoing in mind, the objects of the invention will be more fully appreciated, and it may be said that they include the provision of a structure which will combine greatly improved heat insulating qualities with markedly better sound absorbing characteristics; the provision of an insulating material which will combine the advantages of the heat reflecting type of insulation, such as aluminum or other metal foil, with the sound absorbent type, such as hair felt or other flexible compressible cellular material of a similar or equivalent nature; the provision of a combined absorbent and foil materials which can be easily and safely handled, readily applied to surfaces of varying contour and more adequately and simply secured in position with less liability of the absorbent material "packing down" due to the vibration and jarring to which it is subjected during service; the provision of such a combined material in which the original characteristics of the absorbent material and of the foil material will be substantially preserved so that their usefulness for the respective purposes for which they are intended shall not be impaired; the provision of a lighter-weight insulating material which is better adapted for use in the light weight types of car construction above referred to; the provision of a combined absorbent and foil material in which the security and permanence of the bond between the materials is greatly improved and more easily and inexpensively effected; and the provision of an improved method of manufacturing such a combined felt and foil material which, as stated, will not impair the integrity or useful characteristics of each of the materials entering into the combination, and which, further, will avoid the possibility of condensation forming on the surface of the foil in the finished article.

How the foregoing, together with such other objects as may appear hereinafter or are incident to my invention are obtained is illustrated in a preferred manner in the accompanying drawing, wherein—

Figure 1 is a face view of my improved combination material with its several component layers folded back at one corner in order to more fully illustrate the invention.

Figure 2 is a section on the line 2—2 of Figure 1.

Figure 3 is a view of a portion of the under face of the material illustrated in Figures 1 and 2, and Figure 4 is a partial cross section through the walls of a railway passenger car illustrating my improved insulation as applied to the roof and side walls as well as to an air duct used in connection with an air-conditioning system.

In manufacturing my improved insulating material I prefer to employ a high grade hair felt as the flexible, compressible, cellular sound-absorbent material, although other materials of a similar or equivalent nature might equally well be employed, and in the appended claims I do not wish to be limited to hair felt alone. For example, there are other types of felt materials which could be substituted for hair felt including such felts as are made of combinations of jute and hair or all jute material or saturated and unsaturated wool materials, etc. Materials of this type are customarily manufactured on a paper machine and represent material which has been put through a digester, the mass generally consisting of rag pulp, paper stock and a certain amount of starch to hold it together. There are in addition other felts made of asbestos fiber either saturated or unsaturated with asphalt.

It will be seen, therefore, that any one of quite a number of materials may be employed in manufacturing my improved combined sound absorbent and heat reflective type of insulation, but in order to obtain the particular advantages to which my invention is directed in the greatest possible degree, I prefer, as stated, to employ a high grade hair felt as the absorbent material. In the drawing this is designated by the reference character 5 and it will be noticed that one face of this hair felt is provided with an irregular or interrupted surface 6 known generally as a waffle type surface. The square configuration of these waffle type depressions, however, is not essential as other arrangements might equally well be employed and the expression "waffle like" in this disclosure is intended to broadly designate any similarly interrupted surface which will serve to create a series of relatively dead air spaces when the material is applied to a wall as will further appear. To the opposite or smooth side of the hair felt is applied a relatively thin sheet or covering composed of a layer of paper or other suitable non-metallic backing material 7 and a layer or sheet of metal foil 8 which latter is preferably aluminum foil. The foil, of course, is very thin and the size relationships between the foil, the paper and the felt are not absolutely true to scale because of the difficulty of properly illustrating them were they so drawn.

According to my improved method of manufacture the foil and the paper are first securely bound together by means of any suitable adhesive, after which the combined sheet is secured to the felt also, preferably by means of an adhesive. By proceeding in this way the foil and the paper can be subjected to whatever degree of pressure may be necessary to press out all excess adhesive and secure a firm bond. Furthermore, by proceeding in this way the thinnest possible sheet of foil consistent with the necessary function of reflecting the heat can be employed without the danger of impairing the integrity of the foil. The thinner the foil, of course, the less heat will it transfer by lateral conduction and the more efficient its reflecting characteristics. With my improved material and method of manufacture I am enabled to use a foil which is in the neighborhood of only .00035 of an inch in thickness which is materially less than would be at all possible in an article where the foil was attached directly to the felt without the interposition of a suitable backing as herein disclosed.

As stated, after the paper and the foil are securely united together they are then applied as a unit to the smooth face of the felt and this bond can be effected without the necessity of using undue pressure, which is important in preserving the integrity of the felt, for it will be seen that if any material pressure is applied to the felt its thickness, porosity and cellular characteristics will be impaired with the consequent reduction in its value as an absorbent type insulating material. The layer of paper serves to give added body to the sheet of foil so that the foil can be more easily and safely handled without damage.

While I prefer paper having, for example, the characteristics of newsprint of approximately 30 lbs. weight per ream of 24" by 36" sheets, which paper averages around .0025 of an inch in thickness or a little less, as the backing material, yet I wish it to be understood, of course, that some other backing material might be employed such as a light-weight scrim. The backing material, however, should be reasonably strong as well as flexible so as to give the desired strength to the foil while at the same time permitting whatever degree of curving or bending may be necessary to apply the finished material to its position in the wall to be insulated.

The bonded material is suitably dried at a somewhat elevated temperature so as to remove all excess moisture in order to avoid the possibility of condensation forming on the face of the foil should the material be subjected to atmospheric conditions favoring such condensation. In the absence of thorough drying difficulty of this kind has been encountered particularly during transit where the material is shipped through cold regions. The material is preferably manufactured in long strips of relatively narrow width and rolled into bundles of convenient size and weight and if the moisture is not thoroughly removed the bundles are liable to become so wet or saturated from condensation as to seriously impair the material if not to completely destroy its usefulness.

Figure 4 illustrates the wide adaptability of my improved material especially with respect to its application to corners and curved surfaces. A very effective way to make use of the improved insulating characteristics of my material is to secure it with the waffle side against the wall plate. The upper portion of Figure 4 illustrates the outer and inner roof plates 9 and 10 of a railway passenger car and the lower portion the outer and inner side plates 11 and 12. These merge together at the corner as shown and cooperate with partition plates 13 and 14 to provide an air duct 15, which latter is used in connection with air-conditioning equipment.

Some light mechanical means of attaching the insulation to these walls may be employed if desired and to this end I may provide at suitable places a series of nail-like studs 16, the points of which are bent over against the holding rings or washers 17 after the insulating material has been applied. In cooperation therewith or alternatively, suitable thin metal straps 18 may be sprung into place over the inner face of the insulating material, especially in areas which are curved, such, for example, as the upper outer wall of the air-conditioning duct 15 shown in Figure 4. Such metal straps are similar to the spring straps which are used in subway or street cars to hold advertising cards in place.

However, because of the nominal thickness and light weight of my improved insulating material, very little in the way of mechanical fastening is ever required. I prefer to hold it in place by some type of suitable cement and it is frequently useful to apply a fresh coat of preservative rustproof paint to the surfaces of the sheets against which the insulation is to be applied. Where the vibration is not too great paint alone might be employed on the wall against which the material can be applied before the paint is dry so that, as it does dry, it will form an adhesive bond with the felt.

The waffle-like surface aids in securing a good bond between the felt and the wall to which it is applied especially in instances where the surface of the wall is of an irregular nature because the ridges of the waffle-like surface will project into the cement or the adhesive on the wall. The degree of projection, of course, is very slight but experience has shown that the ease of securing a bond and its permanence are markedly improved where the surface of the felt which is applied to the wall is of waffle-like configuration rather than perfectly plain.

The type of fastening, however, is more or less incidental to the character of the equipment with which the insulating material is being used and it will be understood that it is not my intention to be limited to any particular type of securing means. My improved material lends itself with great adaptability to application in walls of varying contour and it can be cut and fitted into awkward or irregular corners all as clearly suggested in Figure 4 of the drawing.

It will be seen, therefore, that my improved material when applied to a wall structure will provide a series of relatively dead air spaces at the surface of the metal due to the waffle-like face of the felt. These air spaces in and of themselves are available as a means of insulation against the transfer of heat from one side to the other of the wall. In addition the highly reflecting surfaces of the foil sheets 8 prevent the transfer of heat from one side to the other and the foil on the felt serves to seal the latter against passage of foreign matter or moisture. In addition the felt serves to minimize, distribute and deaden noises or telephonic reverberations which might otherwise be transferred through the wall. The relatively stiff backing provided in my improved material serves to prevent undue "packing down" of the sheets of felt, especially when used in vertical walls and in locations where the constant motion and vibration have a tendency to cause the felt to sag down in uneven or irregular masses with the consequent impairment of its insulating functions both as to transfer of heat and as to the transfer of sound. The paper acts somewhat as a reinforcement to the felt which, of course, the foil alone could not do so that a combination of the felt and the foil with its suitable backing material is extremely permanent and satisfactory.

I claim:

1. An insulating material comprising a comparatively thick layer of flexible, compressible, cellular sound-absorbent material, a comparatively thin sheet of metallic foil, and a layer of flexible backing material for the foil interposed between and adhesively united to the sound-absorbent material and to the metallic foil, the layer of sound-absorbent material exhibiting substantially its original thickness, porosity and insulating characteristics.

2. An insulating material comprising a comparatively thick layer of flexible, compressible, cellular sound-absorbent material, a comparatively thin sheet of aluminum foil, and a layer of flexible, non-metallic backing material for the foil interposed between and adhesively united to the sound-absorbent material and to the foil, the layer of sound-absorbent material exhibiting substantially its original thickness and cellular characteristics.

3. An insulating material comprising a comparatively thick layer of flexible, compressible, cellular sound-absorbent material, a sheet of aluminum foil in the neighborhood of .00035 of an inch in thickness, and a backing layer of paper having approximately the characteristics of 30 lb. newsprint interposed between and adhesively united to the absorbent material and to the foil, the layer of absorbent material exhibiting substantially its original thickness and cellular characteristics.

4. An insulating material comprising a layer of hair felt, a sheet of aluminum foil, and a layer of flexible backing material for the foil interposed between and adhesively united to the hair felt and to the aluminum foil, the layer of hair felt exhibiting substantially its original thickness, porosity and insulating characteristics.

5. An insulating material comprising a comparatively thick layer of flexible, compressible, cellular sound-absorbent material having a waffle-like surface on one side thereof, a comparatively thin sheet of metallic foil, and a layer of flexible backing material for the foil interposed between and adhesively united to the foil and to the surface of the sound-absorbent material opposite to said waffle-like surface, the layer of sound-absorbent material exhibiting substantially its original thickness, porosity and insulating characteristics.

6. The method of making a combined sound-absorbent and heat reflecting type of insulating material which comprises adhesively uniting a relatively thin sheet of metallic foil to a sheet of flexible backing material and then adhesively uniting a layer of flexible, compressible, cellular sound-absorbent material to the other face of the backing material whereby the sound-absorbent material will retain substantially its original thickness, porosity and insulating characteristics.

7. The method of making a combined sound-absorbent and heat reflecting type of insulating material which comprises adhesively uniting a relatively thin sheet of metallic foil to a sheet of flexible backing material and then adhesively uniting a layer of flexible, compressible, cellular sound-absorbent material to the other face of the backing material whereby the sound-absorbent material will retain substantially its original thickness, porosity and insulating characteristics and finally drying the material to remove all excess moisture.

GEORGE A. NICOL, JR.